United States Patent [19]
Cordiak

[11] 3,796,465
[45] Mar. 12, 1974

[54] WHEEL GUARD

[76] Inventor: Robert P. Cordiak, 15701 Greendale Ave., Maple Heights, Ohio 44137

[22] Filed: Mar. 17, 1972

[21] Appl. No.: 235,630

[52] U.S. Cl............................................ 301/37 SA
[51] Int. Cl.............................................. B60b 7/02
[58] Field of Search ............ 301/37 R, 37 SA, 37 P; 40/129 B; 46/49, 58, 57; 273/134 AE

[56] References Cited
UNITED STATES PATENTS
3,565,489  2/1971  Eirinberg........................ 301/37 SA
2,621,081  12/1952  Mann.............................. 301/37 SA Primary Examiner—Richard J. Johnson
Attorney, Agent, or Firm—Cain and Lobo

[57] ABSTRACT

A decorative and protective wheel guard for bicycles, tricycles, and other vehicles, and the like, comprising an elongated spiral member adapted to be weaved under and over the spokes of the vehicle wheel until fully seated and positioned within the rim to protect against the driver or passenger putting a foot into the spokes and to provide a decorative and pleasing effect for the driver and observers.

8 Claims, 4 Drawing Figures

WHEEL GUARD

BACKGROUND OF THE INVENTION

Description of Prior Art

Many devices have been proposed for decorating wheeled vehicles including spoked wheel vehicles, Such devices have special appeal to children and young people for decorating their bicycles, tricycles, and the like. Many such devices have proven unsatisfactory either because of the difficulties experienced in installing them, the cost thereof, or the ease with which they are lost, destroyed and/or damaged.

SUMMARY OF INVENTION

It is, therefore, a general object of this invention to provide a new and improved wheel guard for spoked wheel vehicles and the like.

A further object of this invention is to provide a new and improved wheel guard for spoked wheel vehicles and the like which is both decorative and functional to protect users and riders of the vehicle against entanglement in the wheel and, more particularly, the spokes thereof.

Still further objects of this invention include the provision of a new and improved wheel guard for spoked wheel vehicles which is economically manufactured; which is effective to prevent riders and users of the vehicle from having their shoes or feet caught in the spokes; which is foolproof in operation; which is easily mounted and installed without the use of tools or other equipment; which is mounted and positioned on the wheel without need for nuts, bolts, clamps or special holding devices of any kind; which is readily adapted for wheels of different sizes; which does not damage or require modification of the wheel; and which is not accidentally dislodged during use or due to rain, wind, and the like.

A still further object of this invention is to provide a new and improved wheel guard for spoked wheel vehicles obtaining one or more of the objects and advantages set forth above.

These and other objects and advantages of this invention will become apparent from the following description of preferred embodiments thereof, reference being had to the accompanying drawing.

DESCRIPTION OF THE PREFERRED EMBODIMENTS

Figure 1:
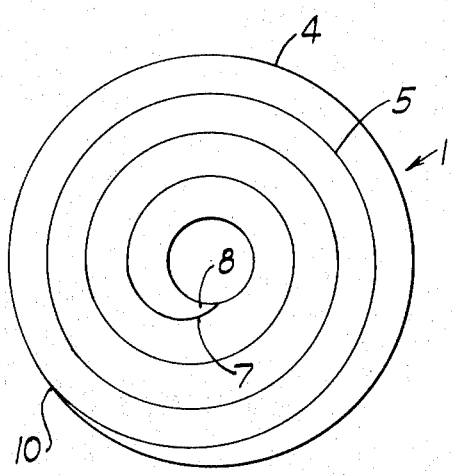
FIG. 1 is an elevational view of a wheel guard embodying a preferred form of this invention.

A wheel guard embodying this invention is indicated generally at 1, FIG. 1.

Figure 2:
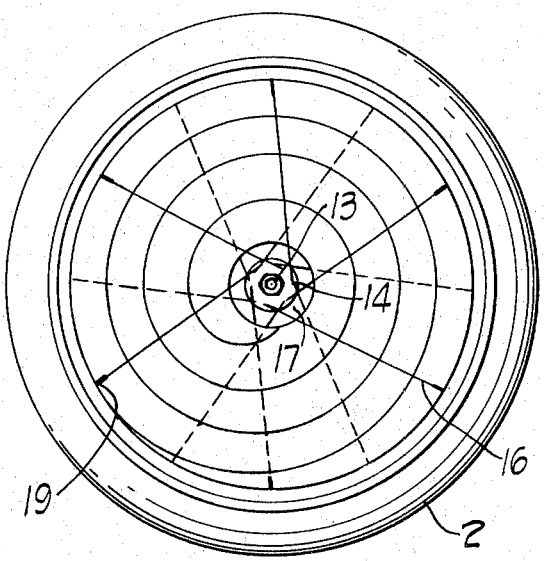
FIG. 2 is an elevational view of a spoked wheel, with the wheel guard of FIG. 1 mounted thereon and therein.

The wheel guard 1 is adapted for mounting in and on a spoked wheel 2, FIG. 2, such as commonly is used in bicycles, tricycles, and the like, which vehicle for clarity of understanding, is not shown in FIG. 2.

As will more fully appear, wheel guard 1 is both decorative and protective.

To this end, the guard 1 is generally flat or thin and may be of any desired color or may have any desired design painted, printed or otherwise placed thereon.

Guard 1 is mounted on wheel 2 without need of any attaching devices, such as nuts, bolts, clamps, or the like, or without need of ordinary or special tools to facilitate or accomplish mounting.

Guard 1 is also adapted to close or substantially close the openings between the spokes so neither the rider (driver), passenger or other person can insert or catch a foot in the spokes. To this end, guard 1 has a circular exterior or circumference 4 the diameter of which preferably is substantially equal to or only slightly smaller than the inside diameter of the wheel rim.

Wheel guard 1 is made of plastic or any other suitable material, and is provided with or is slit or cut, as shown at 5 in FIG. 1, to provide a single cut or separation from the inside of the guard to the outer circumference. The inner end 7 of separation 5 is shaped to provide a tapered end 8 on the first ring, "circle" or convolution of the wheel guard, and the separation is so made so the distance across each succeeding Wheel guard 1 is made of plastic or any other suitable material, and is provided with or is slit or cut, as shown at 5 in FIG. 1 to provide a single cut or separation from the inside of the guard to the outer circumference. The inner end 7 of separation 5 is shaped to provide a tapered end 8 on the first ring, "circle" or convolution of the wheel guard, and the separation is made so the distance across each succeeding "circle," ring or convolution is substantially equal so that the wheel guard comprises a single spirally shaped body member having substantially equal convolutions except at the beginning 7 of the separation and at the end 10 thereof.

As noted above, the guard 1 is flat, being no thicker than is necessary for purposes of manufacture and to stand up under the conditions of use.

Further, guard 1 is provided with a central aperture 11 of sufficient diameter to allow for the axle or hub 13 and spoke connections 14 of the wheel without unnecessarily complicating insertion of the guard by requiring positioning of the end 8 where the spokes are very close together.

In use, guard 1 is weaved or threaded in and on the wheel 2, starting with tapered end 8, under one spoke, 16, for example, and then over the next, 17, and so on until the entire guard is mounted and disposed within the rim 19 of the wheel 2, FIG. 2.

Figure 3:
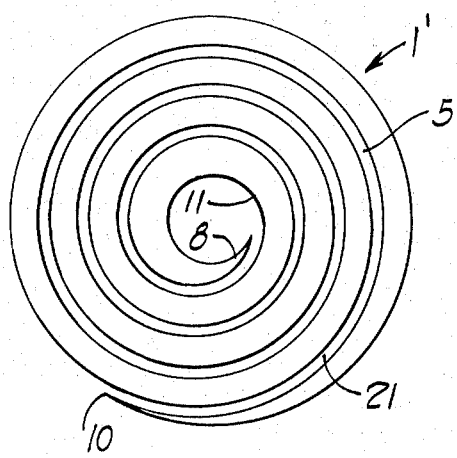
FIG. 3 is an elevational view of another preferred form of wheel guard embodying this invention.

The guard 1', depicted in FIG. 3 is similar to the guard 1 in FIGS. 1 and 2 except that the separation 5' is made of a definite lateral width so that a small space 21 is provided between the adjacent convolutions of the spiral body of guard 1'.

Figure 4:
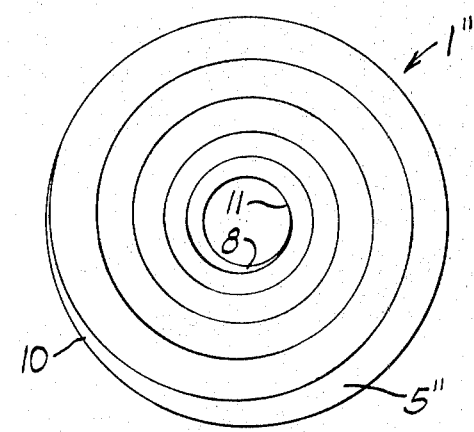
FIG. 4 is an elevational view of still another preferred form of wheel guard embodying this invention.

Guard 1'', depicted in FIG. 4, is likewise similar to guard 1 except that separation 5'' is so formed and spiraled that each succeeding convolution, until the outer or last one, is of a greater distance across rather than the same, as in FIG. 1.

It is noted, also, that two guards, one on each side, are usually used in front, or other, spokes vehicle wheels, which are visible or have access from both sides, since the spoked of a wheel normally are spaced apart, especially at the hub.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:

1. A wheel guard for spoked vehicle wheels, having a hub and a rim, and the like, comprising a flat, planar body member having an aperture at the center and a substantially circular periphery, said aperture being of sufficient size to fit over said hub of the wheel upon which the guard is to be mounted, said periphery being of a diameter to fit within said rim of the wheel upon which said guard is mounted, said guard being substantially equal to the spoked area of said wheel upon which the guard is to be mounted, and a cut or separation extending endlessly, spirally, from said aperture to said periphery and defining a spiral body member having a plurality of concentric convolutions.

2. The wheel guard accordingly to claim 1 in which said separation is of predetermined width and said adjacent convolutions are spaced apart by a distance equal to said width.

3. The wheel guard according to claim 1 wherein each convolution of said spiral body member, except the outermost, is of increasing width from its inner to its outer portions and is of greater width than the adjacent inner and lesser width than the adjacent outer convolution.

4. The wheel guard according to claim 1 mounted on a spoked wheel.

5. The wheel guard and wheel according to claim 4 in which said wheel guard is weaved under one spoke and over the next, alternatively, until mounting is completed.

6. The wheel guard according to claim 1 in which said convolutions are substantially equal in width, relative to the radius of the wheel, except for the beginning of the innermost convolution at said aperture and the ending of the outermost convolution at said periphery.

7. The wheel guard according to claim 6 in which the innermost of said convolutions adjacent said opening is tapered in a direction away from said opening.

8. The wheel guard according to claim 6 in which the outer of said convolutions is tapered in a direction toward said periphery.

* * * * *